Nov. 24, 1970     B. K. NORMAN     3,541,718

FISH LURE

Filed Oct. 18, 1968

INVENTOR

BILL K. NORMAN

BY Townshend & Meserole

ATTORNEYS.

United States Patent Office 3,541,718
Patented Nov. 24, 1970

3,541,718
FISH LURE
Bill K. Norman, 1419 S. Houston,
Fort Smith, Ark. 72901
Filed Oct. 18, 1968, Ser. No. 768,799
Int. Cl. A01k 85/00
U.S. Cl. 43—42.35                    2 Claims

ABSTRACT OF THE DISCLOSURE

A fish lure comprising two concave side sections adhesively united along their mating side edges to form a closed, hollow, buoyant body. Each section has an integral solid block portion inwardly of one end of the lure body with a face abutting the face of the other block portion. Each block portion is slotted from the body end inwardly and has an enlarged opening at the inner end of the slot. A diving plate has a shank with lateral flanges thereon engaged within the slot and openings with the plate being positioned externally of the lure body for attachment to a fishing line.

BACKGROUND OF THE INVENTION

Field

The present invention relates to the art of fish lures and in particular to an artificial bait adapted to simulate the appearance and movements of live bait when it is drawn through the water. Such lures generally are buoyant bodies that normally float on the surface and carry forward or rear end extensions which cause the bait to dive and run submerged when it is pulled through the water. They are commonly known in the art as deep runner lures, and generally comprise a pair of half-sections secured together with portions of the diving extensions anchored between them.

Prior art

Most prior art lures of the deep runner type are hollow shell bodies of thin plastic material made in two separable half-sections which fasten between them a plate that has a portion or portions extended outwardly from the shell, providing a diving or wiggle plate. In the vast majority of such lures, typical of which is the lure disclosed in U.S. Pat. 2,598,771, the wiggle plate is secured in position by a pin or stud passed through an inward extension of the wiggle plate in a plane normal to the plane of the plate portion through which it passes. In consequence, when a fish takes the bait, the resultant load imposed by a heavy fish moving at high speed may create oppositely directed forces of a magnitude sufficient to cause the plate to shear off the pin and thus permit the plate to be pulled axially free from the body.

As the plate is secured to the angler's fishing line and the shell of the lure is anchored in the body of the fish, the fish is lost when the plate and lure are pulled apart.

Such separation cannot occur in the lure of this invention. The interengagement of the shank flanges and shoulders with the body of each section at two points spaced apart lengthwise of the body is such that shearing action of the wiggle plate shank is not possible.

SUMMARY OF THE INVENTION

The present invention provides a buoyant lure whereof the body is a thin shell constituted of two mating half-sections of inexpensive molded plastic material locked together by the inserted shank of an external wiggle plate that extends axially from an end of the lure.

In the present invention the wiggle plate itself is also a connector which holds the shell sections together and at the same time insures that the wiggle plate and the shell body may not be separated by subjection to oppositely acting forces applied axially to the plate and the shell.

The plastic half-sections comprising the hollow shell body of the lure are sealed together by cement or suitable non-water soluble adhesive applied to their mating edge faces, and the strength of this bond is sufficient under normal conditions of use to hold the sections against fortuitous separation.

DRAWINGS

Figure 1:
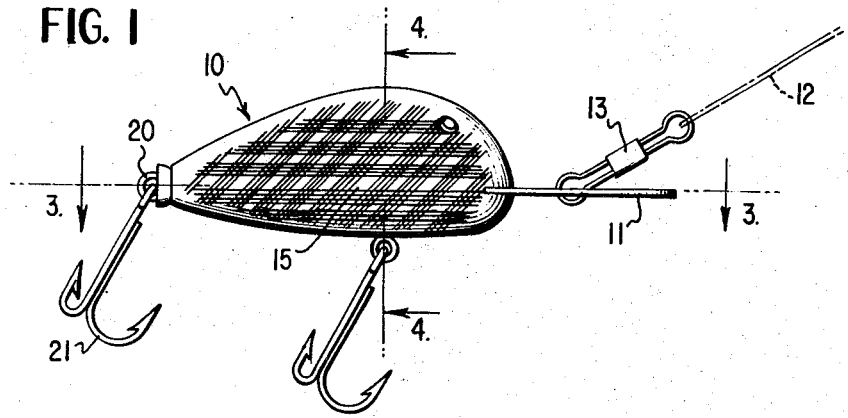
Figure 2:
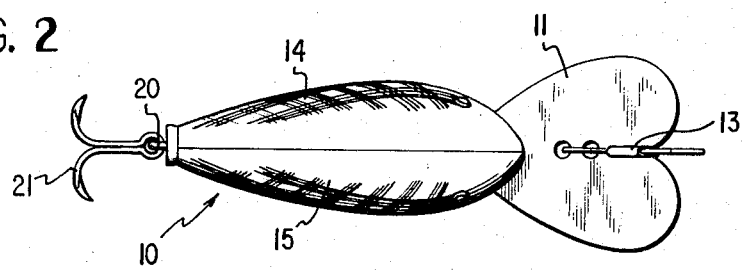
Figure 3:
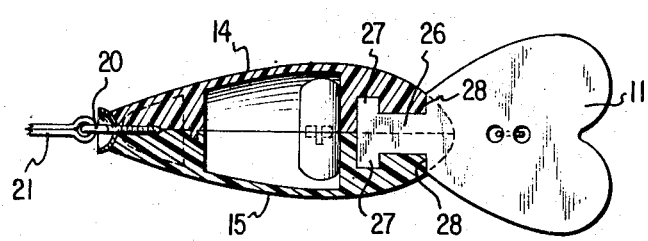
Figure 5:
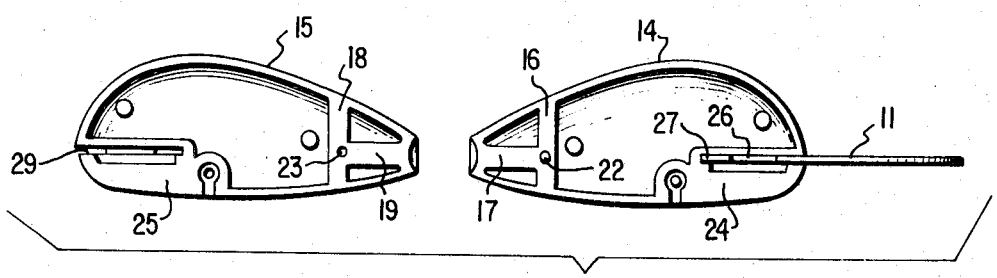
Figure 4:
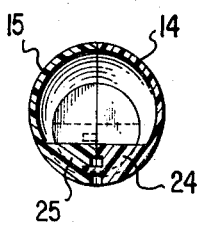

FIG. 1 is a side elevation of a fishing lure constructed in accordance with the present invention.
FIG. 2 is a top plan view thereof.
FIG. 3 is a longitudinal sectional view on line 3—3 of FIG. 1.
FIG. 4 is a sectional view on line 4—4 of FIG. 1.
FIG. 5 is an exploded internal elevational view of the elements of the lure body assembly.

DETAILED DESCRIPTION

The body 10 of the lure when assembled simulates a live bait of the "front running" type, provided with a forwardly-extending, heart-shaped wiggle plate 11. The plate is made of easily bendable metal, so that it may be inclined at an angle relative to the longitudinal axis of the body for selective adjustment of the diving angle of the bait when it is pulled through the water. The plate is adapted for attachment to a fishing line 12 by connector means 13, here shown as permanently secured to the mid-portion of the plate, which may be of any suitable construction.

The lure body proper is made of a pair of complemental concave plastic material side sections 14 and 15 which abut at their opposed meeting edges in the longitudinal median plane of the body. Section 14 is formed with a narrow, transverse web 16 spaced inwardly from the rear end of the section and having a T-head junction with the forward end of a slightly broader web 17 that extends axially to the rear end of the section. In like manner and location, the side section 15 is formed with a transverse web 18 and an axial web 19 which register with the opposite side section webs 16 and 17, respectively, in abutting engagement therewith when the side sections are joined together. As shown in FIG. 3, the mating axial webs provide a support to receive in threaded engagement the shank of an eyebolt 20 to which is attached a hook 21.

A locking pin 22 on the section 14 extends laterally from the face of the junction of webs 16 and 17 for seating in a complemental socket 23 of the junction of webs 18 and 19 on the section 15 when the side sections are connected.

With respect to FIGS. 1 and 4, it is apparent that the lure body has a major axis on the line 3—3 of FIG. 1 and a minor axis on the line 4—4 perpendicular to the major axis. The body of section 14 has a solid block portion 24 at the leading (front) end of the lure extending transversely and rearwardly in the area between the front end of the section, the intersection of the planes of its major and minor axes, and the bottom of the lure. In like manner, the body of section 15 is formed with a solid block portion 25 identical to the portion 24 of section 14.

The diving plate 11 is constituted as a planar heart-shaped member having a narrow shank 26 extending from its point end inwardly with respect to the body of the lure, having at its inner end a pair of oppositely-directed flanges 27 and at its outer end a pair of oppositely-directed shoulders 28 coextensive with the flanges 27. Plate 11, its shank 26, and the flanges 27 lie in a common plane prior to assembly of the lure.

A feature of the present invention is the employment of the diving plate itself as the means by which the side sections of the lure body are locked against fortuitous separation after the lure is assembled. In order to effect this interlocking of the parts, the mating faces of the block portions 24 and 25 are arranged for flat face abutting engagement along the major axis of the body in a plane perpendicular to a plane passed through the minor axis of the body transversely thereof, and each of the portions 24 and 25 is formed with a longitudinally-extending slot 29 open at its outer end through the front wall of its body section and closed at its inner end which lies in the transverse plane of the minor axis of the assembled body. The slot 29 is open for its full length to the mating side face of the solid block portion of the body section in which it is located and lies in the transverse plane of the major axis of the body 11; that is, perpendicular to the transverse plane of its minor axis.

As shown in FIG. 3, the shank 26 of the diving plate is reduced in width between the flanges 27 and shoulders 28, and seats together with the flanges and shoulders in the complemental section slots 29 when the lure is assembled. It is a feature of the invention that the shoulders 28 at the forward end of the shank 26 abut flat shoulders formed in respective sections of the body in a plane normal to the major axis of the lure and spaced axially inwardly from its front end, and that the flanges 27 at the rear end of the shank seat in complemental sockets formed by lateral enlargements of the rear ends of the slots.

In assembling the lure, the mating edge surfaces of the side sections are coated with a cementing compound and the wiggle plate 11 is moved laterally into the open side of the slot 29 in one of the side sections (for example, section 14 in FIG. 5) to seat flange 27 in its socket as seen in FIG. 3. The other side section then is pressed against the first in registry therewith so that the exposed shank flange 27 seats in its socket, thus locking the side sections against relative movement in any direction other than laterally in the plane of the wiggle plate shank. The side sections are pressed tightly together and bonded by the cement on their mating edge surfaces.

I claim:
1. In a fish lure comprising a pair of oblong concave half sections secured together in face to face abutting engagement and constituting a closed, hollow, buoyant body in which each section has therein an integral solid block portion extending axially inward from one end of the lure body, and in which each solid block portion has an inner side face abutting the inner side face of the other block portion:
 (a) each block portion having therein an axial slot opening for its full length to said block inner side face and opening at its outer end to the first-named end of the lure body;
 (b) said first-named end of the lure body having a pair of flat shoulders lying in a plane normal to the major axis of the body;
 (c) the inner end of the slot in each section lying in a plane common thereto and parallel to said shoulders of the first-named end of the lure body;
 (d) each slot having at its inner end a lateral enlargement including a front wall spaced from and parallel to said plane of the inner end of the slot, the enlargement constituting a socket;
 (e) the slot and socket of each section registering in open communication with the respective slot and socket of the other section;
 (f) a diving plate constituted as a heart-shaped portion with an integral shank extending from the point end of the heart-shaped portion to the plane common to the inner ends of the slots and with a pair of oppositely extending lateral enlargements corresponding to the slot sockets in shape and location;
 (g) said shank and its inner end enlargements being complemental to and filling both section slots and their inner end sockets;
 (h) the point end of the heart-shaped portion having, at each side edge of the shank, a shoulder abutting the corresponding shoulder of said first-named end of the lure body; and
 (i) the inner end enlargements of said shank lying in a common plane ninety degrees relative to the plane of the shoulders of the first-named end of the lure body.

2. In the lure of claim 1, said shank enlargements being a pair of oppositely directed flanges.

References Cited

UNITED STATES PATENTS 2,307,200    1/1943    Cullerton _____ 43—42.35
2,598,771    6/1952    Eder _____ 43—42.35

SAMUEL KOREN, Primary Examiner

D. J. LEACH, Assistant Examiner

U.S. Cl. X.R.

43—42.47